United States Patent
Ray et al.

(10) Patent No.: US 11,446,602 B2
(45) Date of Patent: Sep. 20, 2022

(54) PROCESS FOR REMOVAL OF SULFUR DIOXIDE AND AMMONIA FROM A VENT GAS STREAM

(71) Applicant: ThioSolv, LLC, Spring Branch, TX (US)

(72) Inventors: Michael F. Ray, Spring Branch, TX (US); Ronald Shafer, Overland Park, KS (US)

(73) Assignee: THIOSOLV, LLC, Largo, FL (US)

( * ) Notice: Subject to any disclaimer, the term of this patent is extended or adjusted under 35 U.S.C. 154(b) by 0 days.

(21) Appl. No.: 17/329,884

(22) Filed: May 25, 2021

(65) Prior Publication Data

US 2021/0370227 A1     Dec. 2, 2021

Related U.S. Application Data

(60) Provisional application No. 63/029,888, filed on May 26, 2020.

(51) Int. Cl.
    *B01D 53/14*     (2006.01)

(52) U.S. Cl.
    CPC ..... *B01D 53/1406* (2013.01); *B01D 53/1481* (2013.01); *B01D 53/1493* (2013.01); *B01D 2252/103* (2013.01)

(58) Field of Classification Search
    CPC ........ B01D 2257/302; B01D 2257/406; B01D 2252/103; B01D 53/1481; B01D 53/18; B01D 53/1406; B01D 2259/652; B01D 53/1493; B01D 53/50; B01D 53/58; B01D 2258/0283
    See application file for complete search history.

(56) References Cited

U.S. PATENT DOCUMENTS

| | | | |
|---|---|---|---|
| 3,957,951 A | 5/1976 | Hokanson | |
| 4,004,966 A | 1/1977 | Matty | |
| 4,487,139 A * | 12/1984 | Warner | F28D 7/08 165/145 |
| 6,063,352 A | 5/2000 | Risse | |
| 6,277,343 B1 | 8/2001 | Gansley | |
| 9,221,007 B2 * | 12/2015 | Rolker | B01D 53/1493 |
| 2019/0270048 A1 | 9/2019 | Luo et al. | |

FOREIGN PATENT DOCUMENTS

CN     203 382 730 U  *  1/2014  .............. Y02P 20/10

* cited by examiner

*Primary Examiner* — Timothy C Vanoy
(74) *Attorney, Agent, or Firm* — D'Ambrosio & Menon, PLLC; Usha Menon

(57) ABSTRACT

According to an embodiment of the invention, a process for substantially completely removing sulfur dioxide and ammonia from a gas stream is disclosed. The process involves lowering the vapor pressure in a scrubber by contacting the gas stream with one or more streams of re-circulating chilled media. The process further involves adjusting the pH of the process solution in the scrubber to within a predetermined range. The lowering of the vapor pressure and pH adjustment results in an increase in the solubility of sulfur dioxide and ammonia in the process solution thereby facilitating a substantially complete removal of sulfur dioxide and ammonia from the gas stream.

15 Claims, 1 Drawing Sheet

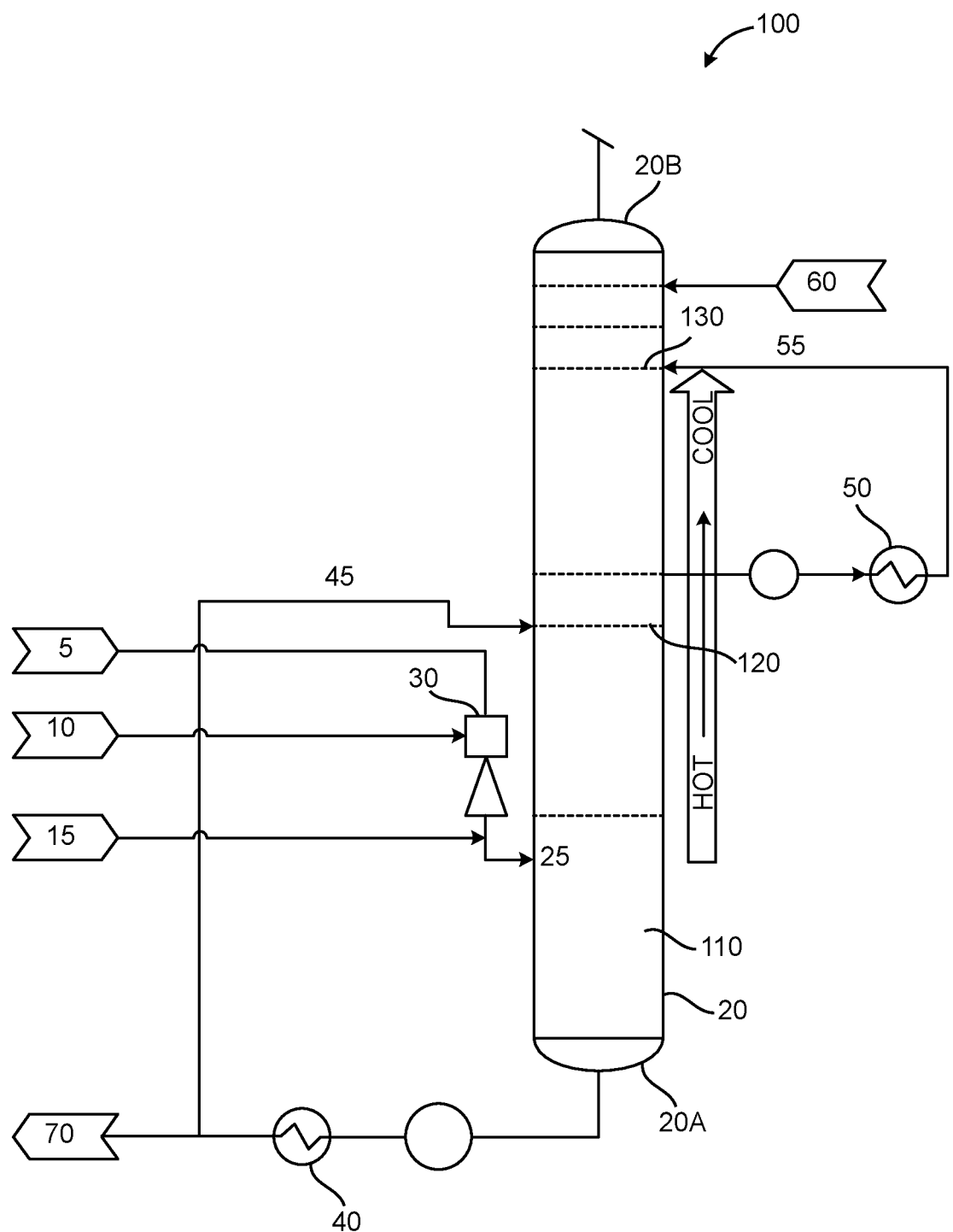

PROCESS FOR REMOVAL OF SULFUR DIOXIDE AND AMMONIA FROM A VENT GAS STREAM

CROSS-REFERENCE TO RELATED APPLICATION

This application claims priority from U.S. Provisional Patent Application No. 63/029,888 filed on May 26, 2020, the entire disclosure of which is part of the disclosure of the present application and is hereby incorporated by reference in its entirety.

TECHNICAL FIELD

The present invention relates to a process for removing sulfur dioxide and ammonia from a feed gas stream.

BACKGROUND

The "background" description provided herein is for the purpose of generally presenting the context of the disclosure. Work of the named inventors, to the extent it is described in this background section, as well as aspects of the description which may not otherwise qualify as prior art at the time of filing, are neither expressly or impliedly admitted as prior art.

During the production of ammonium thiosulfate, ammonium bisulfite or ammonium sulfate, sulfur dioxide ($SO_2$) and ammonia ($NH_3$) can be present in a vapor phase along with the process solution in the scrubber. These combustion gases are elevated in temperature. While the process solution can be scrubbed with a water scrubbing solution, the temperature in the scrubbing section can be around 150° F. to 180° F. due to the combustion gases heating the scrubbing section. The water scrubbing solution, at process condition temperature, can capture most of the $NH_3$ and $SO_2$ gases from the process but the concentration of sulfites in the solution can quickly reach a maximum concentration when the gases reach an equilibrium pressure. As such, at least some of the $NH_3$ and $SO_2$ gases is not captured into the process solution. These gases are then released/vented to the atmosphere.

Sulfur dioxide, in particular, is a very harmful air pollutant. The removal of sulfur dioxide and ammonia is generally essential. In view of the foregoing, one objective of the present invention is to provide a method for substantially removing sulfur dioxide from a feed gas stream, including, a vent gas stream.

SUMMARY

According to an embodiment, at least a stream of chilled media is circulated in a scrubber to create a temperature gradient within the scrubber. In the case of ammonium thiosulfate or ammonium bisulfate plants, a sulfur dioxide rich solution discharged from the bottom of the scrubber can be recycled back into the scrubber as a media stream to eliminate a purge of this stream. The temperature gradient facilitates an increased solubility of ammonia and sulfur dioxide in the process solution by lowering the vapor pressure of these gases. This can then reduce the emission of any harmful sulfur dioxide and ammonia to within an acceptable range. This acceptable range of emissions can extend over a wide range of pHs.

The pH of the process solution can be maintained at an optimal range to keep the sulfur dioxide and ammonia in the solution. At the optimal pH range, the vapor pressure of sulfur dioxide and ammonia are lowered such that it is not released in the gaseous phase. According to one or more embodiments, the pH range to minimize emissions of both ammonia and sulfur dioxide is between 5.3-7.3 and preferably in a pH range of 5.7 and 6.6 depending on temperatures in the scrubber section.

Therefore, according to the one or more embodiments of the invention, the process to remove $SO_2$ and $NH_3$ from a vent gas stream utilizes the solubility differences of the gases in a water solution by lowering the vapor pressure of the sulfur dioxide and ammonia in the gaseous phase. This can be accomplished by cooling the temperature in sections of the scrubber while adjusting the pH values of the scrubbing solution. Advantageously, the process facilitates a substantially complete removal of sulfur dioxide and ammonia from the gas stream.

The foregoing paragraphs have been provided by way of general introduction and are not intended to limit the scope of the following claims. The described embodiments, together with further advantages, will be best understood by reference to the following detailed description taken in conjunction with the accompanying drawing.

BRIEF DESCRIPTION OF THE DRAWING

The invention will be described in further detail below and with reference to the attached drawing which describes or relates to apparatus and methods of the present invention.

FIG. 1 illustrates a schematic diagram of an exemplary system for removing sulfur dioxide and ammonia from a feed gas stream according to an embodiment.

DETAILED DESCRIPTION OF THE INVENTION

Depending on the context, all references below to the "invention" may in some cases refer to certain specific embodiments only. In other cases, it will be recognized that references to the "invention" will refer to subject matter recited in one or more, but not necessarily all, of the claims.

When describing a range of pHs, concentrations and the like, it is the Applicant's intent to disclose every individual number that such a range could reasonably encompass, for example, every individual number that has at least one more significant figure than in the disclosed end points of the range. As an example, when referring to a pH as between about 5 and 7.5, it is intended to disclose that the pH can be 5, 7.5 or any value between these values, including any subranges or combinations of subranges encompassed in this broader range. Applicant's intent is that these two methods of describing the range are interchangeable. Moreover, when a range of values is disclosed or claimed, Applicant also intends for the disclosure of a range to reflect, and be interchangeable with, disclosing any and all sub-ranges and combinations of sub-ranges encompassed therein. Accordingly, Applicant reserves the right to proviso out or exclude any individual members of any such group, including any sub-ranges or combinations of sub-ranges within the group, or any selection, feature, or aspect that can be claimed, if for any reason Applicant chooses to claim less than the full measure of the disclosure, for example, to account for a reference that Applicant may be unaware of at the time of the filing of the application. In particular, the ranges set forth herein include their endpoints unless expressly stated otherwise.

The term "about" means that pH, temperature and other parameters and characteristics are not and need not be exact, but may be approximate and/or larger or smaller, as desired, reflecting tolerances, conversion factors, rounding off, measurement error and the like, and other factors known to those of skill in the art. An amount, size, formulation, parameter or other quantity or characteristic is "about" or "approximate" whether or not expressly stated to be such. Whether or not modified by the term "about", the claims include equivalents to the values stated therein. The term "about" may mean within 10% of the reported numerical value, for example, within 5% of the reported numerical value.

For the purposes of this invention, a scrubber can be any or a combination of towers, contactors, columns, trays, vessels, pumps, valves, control systems, and any other equipment known in the art useful in facilitating the contact of a liquid and a gas. FIG. 1 illustrates an exemplary system 100 for removing sulfur dioxide and ammonia from a feed gas stream. The system 100 includes a multiple-stage liquid-vapor vent scrubber 20 having multiple scrubbing zones or contact zones 110, 120 and 130.

As shown in FIG. 1, in a first stage during the production of a solution containing ammonium thiosulfate, ammonium bisulfite or ammonium sulfate, a stream containing a hot sulfur dioxide rich gas 5 and a warm sulfur dioxide lean liquid 10 is contacted in a venturi contactor 30 to produce a solution which, along with residual sulfur dioxide and an ammonia vapor stream 15, is passed into a lower section of scrubber 20. It is noted that during the first stage, about 95%-98% of the sulfur dioxide in the feed stream is removed. In the scrubber 20, the sulfur dioxide reacts with an excess of ammonia in the presence of oxygen and water vapor to produce a sulfur dioxide rich process solution, such as, ammonium sulfate, ammonium thiosulfate or ammonium bisulfite. The sulfur dioxide rich solution can be removed or discharged from the bottom portion of the scrubber 20A.

The sulfur dioxide and ammonia are present in a vapor phase along with the process solution in the scrubber 20. These gases are elevated in temperature and create an elevated temperature in the scrubber. In conventional processes, a water scrubbing solution, at process condition temperature, is used to capture the residual sulfur dioxide and ammonia from the process. Typically, the temperature in the central zone of the scrubber 20 may be between 150° F. to 190° F., due to, for instance, the gases that come in contact with the scrubbing solution. The heated water, at process condition temperature, can capture most of the ammonia and sulfur dioxide gases. This results in the concentration of sulfites (for the purposes of this invention, "sulfite" includes any combination of sulfite ion, bisulfite ion, ammonium sulfite, and/or ammonium bisulfite) in the process solution to increase quickly. It should be readily understandable to persons skilled in the art that ammonium sulfite and ammonium bisulfite are present in ionic form in the scrubbing (or scrub) solution. However, the vapor pressure of the gases is also elevated with the increase in temperature such that at least some of the sulfur dioxide and ammonia gases is not captured into the process solution. These gases are eventually vented to the environment through vents in the scrubber 20, causing pollution and posing a health hazard.

The inventors of the present disclosure determined that this emission of sulfur dioxide and ammonia gases generally exceeded allowable limits due to three causes: 1) the build-up/formation of sulfites in the scrub solution; 2) the high temperature of the solution in the scrubber that causes a corresponding increase in the vapor pressure of sulfur dioxide and ammonia over a range of pH values; and 3) the pH of the solution that causes an increase in the vapor pressure of ammonia and/or sulfur dioxide. Further, if the pH values of the process solution are outside an optimal range, sulfur dioxide and ammonia do not remain in the solution phase and instead they have an increased propensity to get released in the gaseous phase through the vents.

According to an embodiment, a predetermined temperature gradient is maintained in the scrubber 20 such that the temperature of the zone proximal to the gas inlet 25, referred to as the first contact zone 110, is higher than a temperature of the contact zones distal to it, that is, a second scrubber contact zone 120 and a third scrubber contact zone 130. The temperature in the first contact zone 110 is usually in the range of 120° F. to 190° F.

A temperature gradient can be established by circulating/introducing one or more chilled streams of media in the scrubber 20. In one aspect, during the production of ammonium thiosulfate, ammonium sulfite or ammonium bisulfite, the media includes the sulfur dioxide rich solution (such as, the produced ammonium thiosulfate and ammonium bisulfite) that is purged from the bottom of the scrubber 20A. This sulfur dioxide rich solution is passed through an in-line heat exchanger or cooler 40 where it is chilled to a temperature between 60° F. to 120° F. A side stream of the cooled solution 45 is re-routed to the second zone of the scrubber 120 such that the temperature in this zone can be lowered and maintained in the range of 70° F. to 90° F. This causes a significant reduction in the vapor pressure of the sulfur dioxide and ammonia. The use of the recycled solution is also desirable since it includes a higher concentration of salts. This aids in improving solubility of sulfur dioxide and ammonia in the circulating scrubbing solution and/or aids in keeping the sulfur dioxide and ammonia in the solution phase (in the chilled scrubbing solution). This facilitates the capture/removal of sulfur dioxide and ammonia gases in greater concentrations in the solution phase.

In another aspect, the media includes the circulating liquid inside the scrubber. This circulating liquid includes picked up liquid particle drift along with residual sulfur dioxide and ammonia. A side stream containing the circulating liquid is removed from the scrubber 20 and passed through an in-line heat exchanger or cooler 50. The cooled circulating liquid 55 is introduced into the third contact zone 130 such that the temperature in this zone can be maintained in the range of 60° F. to 70° F.

Thus, the third contact zone 130 that is distal most from the inlet 25 has the lowest temperature while the first contact zone 110 has the highest temperature. This temperature gradient can facilitate the optimal capturing/removal of sulfur dioxide and ammonia from the gas stream into the solution as the gas stream rises in the scrubber 20 traversing the scrubbing zones from 110 to 130.

According to an embodiment, by maintaining the temperature gradient, around 99% of the sulfur dioxide and ammonia can be removed in the solution phase in the second contact zone while around 99.99% of the residual sulfur dioxide and ammonia can be removed in the solution phase in the third contact zone. The remaining trace amounts of sulfur dioxide and ammonia remaining in the scrubber 20 is contacted with demineralized water 60 before the gas stream is vented to the atmosphere. This is the final stage of scrubbing. A small amount of sulfuric acid can be added to the water and to neutralize and remove additional amounts of ammonia so that an essentially ammonia-free stream leaves the top of the scrubber 20B. An ammonium sulfate solution, from which substantially all the ammonia has been stripped, descends to the bottom of the scrubber and is removed from the bottom section of the scrubber 20A. In any given stage of the scrubber 20, liquid and vapor phases are present.

While circulating the stream of chilled media, one or more control parameters can be adjusted to obtain an effluent gaseous stream that is substantially devoid of sulfur dioxide and ammonia. The control parameters can include the pH of the media stream and concentration of sulfites in the stream of media. The pH of the scrubber solution may be indicative of the ratio of ammonium ions to sulfite ions in the scrubber. The pH can easily be measured, for example, using a pH probe (not shown). As the pH values fall, the ammonia levels also fall correspondingly.

In one embodiment, as the chilled media is circulated within the scrubber, the pH of the chilled stream can be adjusted within a predetermined optimal range to control the amount of sulfur dioxide and ammonia that can be removed from the gaseous stream. In one embodiment, the pH of the chilled stream can be maintained between 5 and 7.5. In one embodiment, the pH of the chilled stream is maintained at about 5.3 to about 7.3. In a specific embodiment, the pH of the chilled stream is maintained at about 5.7 to about 6.6. Maintaining the pH of the scrubbing solution within the predetermined optimal range significantly lowers the vapor pressure of sulfur dioxide and ammonia, and further facilitates in increasing solubility of sulfur dioxide and ammonia in the solution. The pH can be adjusted by any known technique. For example, the pH can be adjusted by adding ammonia or lowering the amount of ammonia in the solution. In an embodiment, ammonia can be added to the recycle stream 55 that enters the scrubber 20. It is noted that adding ammonia will increase the pH and lowering the ammonia addition will decrease the pH of the solution in the scrubber.

In another embodiment, the temperature of the first contact zone 110 can be further reduced. For example, the temperature of the first contact zone 110 can be reduced to about 120° F. to 140° F. using a suitable device, such as, an air cooler (not shown).

In one or more embodiments, by lowering the concentration of ammonium sulfite or ammonium bisulfite (ABS) along with the establishment of a temperature gradient in the scrubber 20, an even lower emission of sulfur dioxide can be obtained. For instance, when the concentration of the ABS is lowered to at or below 5% w/w, the sulfur dioxide emission was also further lowered.

Accordingly, the process of the present disclosure results in a gaseous stream substantially devoid of sulfur dioxide and ammonia which is suitable for venting-off to the ambient environment.

The optimal removal of sulfur dioxide and ammonia can also be facilitated by adjusting the gas velocity to liquid circulation in the scrubber, changing the packing depth and the number of trays in the scrubber, and modifying the ammonia and sulfur dioxide concentration in the gas stream.

As detailed hereinabove, the process can be carried out in a single multiple-stage liquid-vapor scrubber that may aid in the removal of substantially all the sulfur dioxide present in the gas stream (for instance, about 95%-99.99% of the sulfur dioxide present in the gas stream). However, a person skilled in the art will recognize that the output from a plurality of multiple-stage liquid-vapor scrubber 20 (such as, gas stream exiting from the vent/outlet of such scrubber containing uncaptured sulfur dioxide and/or ammonia) may be subjected to the advantageous process of the present disclosure.

Additionally, although one or more embodiments have been described in terms of sulfur dioxide removal being done in the plurality of scrubbing zones, it is to be appreciated that these zones may also be in continuum in a scrubber without any physical segregation or interruption therebetween, wherein the plurality of scrubbing zones merely denote different areas of the scrubber having different temperatures (temperature gradient as detailed above).

Experimental Data

Table 1 illustrates the concentration of ammonia and sulfur dioxide in parts per million volume (ppmv) in the vapor phase above a solution containing 15% ammonium bisulfate/sulfite solution at 180° F. The inventors determined that, as the pH value of the solution drops below 6.6, sulfur dioxide emissions exceed desired levels. As can be observed in Table 1, with a further reduction in pH, the ammonia emissions drop but the concentration of sulfur dioxide can exceed 100 ppmv. It was further determined that the ammonia emissions at 15% solution far exceeded the desired limits to maintain low sulfur dioxide emissions.

TABLE 1

| | Equilibrium Pressure @ 180° F. | | |
|---|---|---|---|
| pH @ 77° F. | pH @ T | yNH3 (ppmv) | ySO2 (ppmv) |
| 5.50 | 5.91 | 1,306.42 | 505.07 |
| 5.87 | 6.28 | 3,249.21 | 196.36 |
| 6.24 | 6.63 | 8,025.01 | 73.30 |
| 6.50 | 6.85 | 14,664.02 | 36.11 |
| 6.75 | 7.03 | 23,737.87 | 19.67 |
| 7.06 | 7.18 | 35,725.58 | 11.31 |
| 7.50 | 7.30 | 49,160.91 | 7.17 |

The emissions decreased at lower concentrations of ammonia and sulfites in the solution. This can be achieved by increasing the purge rate from the scrubber or by using the solution for makeup in the process as required.

Table 2 shows the same ammonium bisulfite content in the water scruber at significantly lower vapor pressures of the components over a much broader range of pH values. It was determined that as the temperature drops, the vapor pressure drops quickly, and the acceptable range of emissions can extend to a wider range of pH.

TABLE 2

Equilibrium Pressure SO2/NH3 at 180° F. at various pH 5.0 Wt. ABS

| | | y/Component ppm | |
|---|---|---|---|
| pH @ T | ° F. | $pNH_3$ | $pSO_2$ |
| 5.91 | 180 | 1210 | 460.0 |
| 6.28 | 180 | 2700 | 195.9 |
| 6.63 | 180 | 6284 | 73.7 |
| 6.85 | 180 | 11263 | 31.3 |
| 7.03 | 180 | 18820 | 10.7 |
| 7.18 | 180 | 29705 | 1.9 |
| 7.30 | 180 | 43719 | 0.0 |

Table 3 illustrates the concentration of ammonia and sulfur dioxide over a solution containing 15% ammonium and sulfite/bisulfate ions at 90° F.

TABLE 3

| | Equilibrium Pressure @ 90° F. 15% ABS | | |
|---|---|---|---|
| pH @ 77° F. | pH @ T | $yNH_3$ (ppmv) | $ySO_2$ (ppmv) |
| 5.50 | 5.56 | 2.57 | 63.02 |
| 5.87 | 5.94 | 6.52 | 23.78 |
| 6.24 | 6.31 | 17.15 | 8.09 |
| 6.50 | 6.57 | 34.96 | 3.35 |
| 6.75 | 6.82 | 68.80 | 1.32 |

TABLE 3-continued

| | Equilibrium Pressure @ 90° F. 15% ABS | | |
|---|---|---|---|
| pH @ 77° F. | pH @ T | yNH$_3$ (ppmv) | ySO$_2$ (ppmv) |
| 7.06 | 7.12 | 149.85 | 0.39 |
| 7.50 | 7.52 | 403.80 | 0.07 |

Table 4 illustrates a combination of a lower temperature and a lower concentration of ammonium sulfite/bisulfite over the same pH range. The inventors determined that the combination of low concentration and temperature allow for a wider range of pH in the scrubbing solution and for upsets in upstream units.

TABLE 4

| Equilibrium Pressure SO2/NH3 @ 90° F. at various pHs 5.0 Wt. ABS | | | |
|---|---|---|---|
| | | y/Component ppm | |
| pH @ T | ° F. | pSO$_2$ | pNH$_3$ |
| 5.91 | 90 | 23.3 | 5.3 |
| 6.28 | 90 | 9.91 | 11.7 |
| 6.63 | 90 | 3.7 | 27.3 |
| 6.85 | 90 | 1.56 | 48.9 |
| 7.03 | 90 | 0.54 | 81.7 |
| 7.18 | 90 | 0.1 | 128.9 |
| 7.30 | 90 | 0.0 | 180.7 |

Therefore, the present invention is well adapted to attain the ends and advantages mentioned as well as those that are inherent therein. It is to be appreciated that any effluent gas stream having ammonia and sulfur dioxide in an amount more than predetermined permissible effluent limits may be subjected to the advantageous process of the present disclosure. An engineer skilled in the art of designing columns for this service will be able to design for the required scrubber configuration. The previous description is not intended to limit the invention, which may be used according to different aspects or embodiments without departing from the scopes thereof.

Furthermore, the particular illustrative embodiments disclosed above may be altered or modified and all such variations are considered within the scope and spirit of the present invention. While process is described in terms of "comprising," "containing," or "including" various devices/components or steps, it is understood that the process also can "consist essentially of" or "consist of" the various components and steps. Whenever a numerical range with a lower limit and an upper limit is disclosed, any number and any included range falling within the range is specifically disclosed.

The invention claimed is:

1. A process for removing sulfur dioxide and ammonia from a gas stream in a scrubber comprising:
    establishing a temperature gradient in the scrubber to lower vapor pressure of the gas stream; and
    adjusting pH of a process solution in the scrubber to within a predetermined range.

2. The process according to claim 1, wherein the establishing a temperature gradient involves re-circulating one or more streams of media within the scrubber.

3. The process according to claim 2, wherein the one or more streams of media is cooled to a predetermined temperature before being re-circulated.

4. The process according to claim 2, wherein a first media stream comprises a sulfur dioxide rich liquid discharged from a bottom of the scrubber.

5. The process according to claim 4, wherein the first media stream is passed through a first cooler before it is re-circulated within a first section of the scrubber.

6. The process according to claim 2, wherein a second media stream comprises the process solution diverted from a second section of the scrubber.

7. The process according to claim 6, wherein the second media stream is passed through a second cooler before it is re-circulated within a third section of the scrubber.

8. The process according to claim 1, wherein the lowering of the vapor pressure of the gas stream facilitates an increased absorption of the sulfur dioxide and ammonia into the process solution.

9. The process according to claim 8, wherein residual unabsorbed sulfur dioxide and ammonia is vented from a top section of the scrubber.

10. The process according to claim 9, wherein the residual unabsorbed sulfur dioxide and ammonia is washed with water prior to being vented.

11. The process according to claim 1, wherein adjusting pH of the process solution involves lowering a concentration of sulfite ions and/or bisulfate ions in the process solution.

12. The process according to claim 11, wherein the pH of the process solution is adjusted to about 5.0 to about 7.5.

13. The process according to claim 11, wherein the pH of the process solution is adjusted to about 5.3 to about 7.3.

14. The process according to claim 11, wherein the pH of the process solution is adjusted to about 5.7 to about 6.6.

15. The process according to claim 11, wherein the concentration of sulfite ions and/or bisulfate ions is maintained at or below 5% w/w of the process solution.

* * * * *